(12) United States Patent
Liu et al.

(10) Patent No.: US 9,595,273 B1
(45) Date of Patent: Mar. 14, 2017

(54) SHINGLE MAGNETIC WRITER HAVING NONCONFORMAL SHIELDS

(71) Applicant: Western Digital (Fremont), LLC, Fremont, CA (US)

(72) Inventors: Feng Liu, San Ramon, CA (US); Zhigang Bai, Fremont, CA (US); Jinqiu Zhang, Fremont, CA (US); Zhanjie Li, Pleasanton, CA (US); Yi Wang, Mountain View, CA (US)

(73) Assignee: WESTERN DIGITAL (FREMONT), LLC, Fremont, CA (US)

( * ) Notice: Subject to any disclaimer, the term of this patent is extended or adjusted under 35 U.S.C. 154(b) by 0 days.

(21) Appl. No.: 14/871,763

(22) Filed: Sep. 30, 2015

(51) Int. Cl.
*G11B 5/31* (2006.01)
*G11B 5/23* (2006.01)
*G11B 5/127* (2006.01)

(52) U.S. Cl.
CPC .......... *G11B 5/3116* (2013.01); *G11B 5/1278* (2013.01); *G11B 5/23* (2013.01)

(58) Field of Classification Search
None
See application file for complete search history.

(56) References Cited

U.S. PATENT DOCUMENTS

| 6,016,290 A | 1/2000 | Chen et al. |
| 6,018,441 A | 1/2000 | Wu et al. |
| 6,025,978 A | 2/2000 | Hoshi et al. |
| 6,025,988 A | 2/2000 | Yan |
| 6,032,353 A | 3/2000 | Hiner et al. |
| 6,033,532 A | 3/2000 | Minami |
| 6,034,851 A | 3/2000 | Zarouri et al. |
| 6,043,959 A | 3/2000 | Crue et al. |
| 6,046,885 A | 4/2000 | Aimonetti et al. |
| 6,049,650 A | 4/2000 | Jerman et al. |
| 6,055,138 A | 4/2000 | Shi |
| 6,058,094 A | 5/2000 | Davis et al. |
| 6,073,338 A | 6/2000 | Liu et al. |
| 6,078,479 A | 6/2000 | Nepela et al. |
| 6,081,499 A | 6/2000 | Berger et al. |
| 6,094,803 A | 8/2000 | Carlson et al. |
| 6,099,362 A | 8/2000 | Viches et al. |
| 6,103,073 A | 8/2000 | Thayamballi |

(Continued)

FOREIGN PATENT DOCUMENTS

JP 2010061735 A * 3/2010
KR 20090050746 A * 5/2009

*Primary Examiner* — Will J Klimowicz
(74) *Attorney, Agent, or Firm* — Convergent Law Group LLP

(57) ABSTRACT

A shingle magnetic write apparatus is described. The shingle magnetic write apparatus includes a pole, a side gap, a write gap, a top shield and side shield(s). The pole has a pole tip region including a top wider than a bottom, and sides. The sides are at a sidewall angle from a down track direction. The write gap is adjacent to the pole top and between the top shield and the pole top. The side shield(s) are magnetically connected with the top shield and extend past the bottom of the pole. The side gap is between the side shield(s) and the pole. The side shield(s) have pole-facing surface(s) not more than a side shield angle from the down track direction. The side shield angle is less than the sidewall angle. The side gap width increases from the top near the gap to the bottom near the bottom of the pole.

15 Claims, 10 Drawing Sheets

(56) References Cited

U.S. PATENT DOCUMENTS

| | | |
|---|---|---|
| 6,108,166 A | 8/2000 | Lederman |
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |

(56) References Cited

U.S. PATENT DOCUMENTS

| | | |
|---|---|---|
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Chen et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,954,340 B2 * | 10/2005 | Shukh .................. G11B 5/11 360/119.02 |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,493,688 B1 | 2/2009 | Wang et al. |
| 7,508,627 B1 | 3/2009 | Zhang et al. |
| 7,517,463 B1 | 4/2009 | Bonhote et al. |

(56) References Cited

U.S. PATENT DOCUMENTS

| | | |
|---|---|---|
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,565,732 B2 | 7/2009 | Le et al. |
| 7,583,466 B2 | 9/2009 | Kermiche et al. |
| 7,587,810 B2 | 9/2009 | Le |
| 7,595,967 B1 | 9/2009 | Moon et al. |
| 7,639,457 B1 | 12/2009 | Chen et al. |
| 7,649,712 B2 | 1/2010 | Le et al. |
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,788,798 B2 | 9/2010 | Guthrie et al. |
| 7,796,356 B1 | 9/2010 | Fowler et al. |
| 7,800,858 B1 | 9/2010 | Bajikar et al. |
| 7,804,662 B2 | 9/2010 | Chen et al. |
| 7,804,666 B2 * | 9/2010 | Guan .................... G11B 5/11 360/319 |
| 7,819,979 B1 | 10/2010 | Chen et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,894,159 B2 | 2/2011 | Lengsfield, III et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,920,359 B2 * | 4/2011 | Maruyama ........... G11B 5/1278 360/125.3 |
| 7,968,219 B1 | 6/2011 | Jiang et al. |
| 7,982,989 B1 | 7/2011 | Shi et al. |
| 7,990,653 B2 * | 8/2011 | Mochizuki ............. G11B 5/11 360/125.09 |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,031,433 B2 * | 10/2011 | Yan ...................... G11B 5/1278 360/125.03 |
| 8,035,930 B2 * | 10/2011 | Takano ................ G11B 5/1278 360/319 |
| 8,049,988 B2 * | 11/2011 | Kameda ................ G11B 5/3116 360/119.04 |
| 8,051,552 B2 * | 11/2011 | Jiang ...................... G11B 5/112 205/119 |
| 8,054,578 B2 * | 11/2011 | Kameda .................... G11B 5/11 360/119.04 |
| 8,054,586 B2 | 11/2011 | Balamane et al. |
| 8,066,892 B2 | 11/2011 | Guthrie et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,099,855 B2 | 1/2012 | Le |
| 8,104,166 B1 | 1/2012 | Zhang et al. |
| 8,108,986 B2 | 2/2012 | Liu |
| 8,110,085 B2 | 2/2012 | Hsiao et al. |
| 8,116,043 B2 | 2/2012 | Leng et al. |
| 8,116,171 B1 | 2/2012 | Lee |
| 8,120,874 B2 | 2/2012 | Hsiao et al. |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,238,059 B1 | 8/2012 | Tang et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,323,727 B2 | 12/2012 | Pentek et al. |
| 8,325,569 B1 | 12/2012 | Shi et al. |

(56) References Cited

U.S. PATENT DOCUMENTS

| | | | |
|---|---|---|---|
| 8,333,008 B1 | 12/2012 | Sin et al. | |
| 8,334,093 B2 | 12/2012 | Zhang et al. | |
| 8,336,194 B2 | 12/2012 | Yuan et al. | |
| 8,339,735 B2* | 12/2012 | Mallary | B82Y 10/00 360/122 |
| 8,339,738 B1 | 12/2012 | Tran et al. | |
| 8,341,826 B1 | 1/2013 | Jiang et al. | |
| 8,343,319 B1 | 1/2013 | Li et al. | |
| 8,343,364 B1 | 1/2013 | Gao et al. | |
| 8,345,383 B2 | 1/2013 | Yan et al. | |
| 8,349,195 B1 | 1/2013 | Si et al. | |
| 8,351,307 B1 | 1/2013 | Wolf et al. | |
| 8,357,244 B1 | 1/2013 | Zhao et al. | |
| 8,373,945 B1 | 2/2013 | Luo et al. | |
| 8,375,564 B1 | 2/2013 | Luo et al. | |
| 8,375,565 B2 | 2/2013 | Hu et al. | |
| 8,381,391 B2 | 2/2013 | Park et al. | |
| 8,385,020 B2 | 2/2013 | Min | |
| 8,385,157 B1 | 2/2013 | Champion et al. | |
| 8,385,158 B1 | 2/2013 | Hu et al. | |
| 8,394,280 B1 | 3/2013 | Wan et al. | |
| 8,400,731 B1 | 3/2013 | Li et al. | |
| 8,400,732 B2* | 3/2013 | Matono | G11B 5/112 360/125.12 |
| 8,404,128 B1 | 3/2013 | Zhang et al. | |
| 8,404,129 B1 | 3/2013 | Luo et al. | |
| 8,405,930 B1 | 3/2013 | Li et al. | |
| 8,409,453 B1 | 4/2013 | Jiang et al. | |
| 8,411,384 B2 | 4/2013 | Mochizuki et al. | |
| 8,411,390 B2 | 4/2013 | Franca-Neto et al. | |
| 8,413,317 B1 | 4/2013 | Wan et al. | |
| 8,416,540 B1 | 4/2013 | Li et al. | |
| 8,419,953 B1 | 4/2013 | Su et al. | |
| 8,419,954 B1 | 4/2013 | Chen et al. | |
| 8,422,176 B1 | 4/2013 | Leng et al. | |
| 8,422,342 B1 | 4/2013 | Lee | |
| 8,422,841 B1 | 4/2013 | Shi et al. | |
| 8,424,192 B1 | 4/2013 | Yang et al. | |
| 8,441,756 B1 | 5/2013 | Sun et al. | |
| 8,443,510 B1 | 5/2013 | Shi et al. | |
| 8,444,866 B1 | 5/2013 | Guan et al. | |
| 8,449,948 B2 | 5/2013 | Medina et al. | |
| 8,451,556 B1 | 5/2013 | Wang et al. | |
| 8,451,563 B1 | 5/2013 | Zhang et al. | |
| 8,454,846 B1 | 6/2013 | Zhou et al. | |
| 8,455,119 B1 | 6/2013 | Jiang et al. | |
| 8,456,961 B1 | 6/2013 | Wang et al. | |
| 8,456,963 B1 | 6/2013 | Hu et al. | |
| 8,456,964 B1 | 6/2013 | Yuan et al. | |
| 8,456,966 B1 | 6/2013 | Shi et al. | |
| 8,456,967 B1 | 6/2013 | Mallary | |
| 8,458,892 B2 | 6/2013 | Si et al. | |
| 8,462,592 B1 | 6/2013 | Wolf et al. | |
| 8,468,682 B1 | 6/2013 | Zhang | |
| 8,470,186 B2 | 6/2013 | Chen et al. | |
| 8,472,139 B2* | 6/2013 | Urakami | G11B 5/1278 360/119.02 |
| 8,472,288 B1 | 6/2013 | Wolf et al. | |
| 8,480,911 B1 | 7/2013 | Osugi et al. | |
| 8,486,285 B2 | 7/2013 | Zhou et al. | |
| 8,486,286 B1 | 7/2013 | Gao et al. | |
| 8,488,272 B1 | 7/2013 | Tran et al. | |
| 8,491,801 B1 | 7/2013 | Tanner et al. | |
| 8,491,802 B1 | 7/2013 | Gao et al. | |
| 8,493,693 B1 | 7/2013 | Zheng et al. | |
| 8,493,695 B1 | 7/2013 | Kaiser et al. | |
| 8,495,813 B1 | 7/2013 | Hu et al. | |
| 8,498,084 B1 | 7/2013 | Leng et al. | |
| 8,506,828 B1 | 8/2013 | Osugi et al. | |
| 8,514,517 B1 | 8/2013 | Batra et al. | |
| 8,518,279 B1 | 8/2013 | Wang et al. | |
| 8,518,832 B1 | 8/2013 | Yang et al. | |
| 8,520,336 B1 | 8/2013 | Liu et al. | |
| 8,520,337 B1 | 8/2013 | Liu et al. | |
| 8,524,068 B2 | 9/2013 | Medina et al. | |
| 8,526,275 B1 | 9/2013 | Yuan et al. | |
| 8,531,801 B1 | 9/2013 | Xiao et al. | |
| 8,532,450 B1 | 9/2013 | Wang et al. | |
| 8,533,937 B1 | 9/2013 | Wang et al. | |
| 8,537,494 B1 | 9/2013 | Pan et al. | |
| 8,537,495 B1 | 9/2013 | Luo et al. | |
| 8,537,502 B1 | 9/2013 | Park et al. | |
| 8,545,999 B1 | 10/2013 | Leng et al. | |
| 8,547,659 B1 | 10/2013 | Bai et al. | |
| 8,547,667 B1 | 10/2013 | Roy et al. | |
| 8,547,730 B1 | 10/2013 | Shen et al. | |
| 8,555,486 B1 | 10/2013 | Medina et al. | |
| 8,559,141 B1 | 10/2013 | Pakala et al. | |
| 8,563,146 B1 | 10/2013 | Zhang et al. | |
| 8,565,049 B1 | 10/2013 | Tanner et al. | |
| 8,568,601 B2 | 10/2013 | Pentek et al. | |
| 8,570,686 B2* | 10/2013 | Hosomi | G11B 5/235 360/125.3 |
| 8,576,517 B1 | 11/2013 | Tran et al. | |
| 8,578,594 B2 | 11/2013 | Jiang et al. | |
| 8,582,238 B1 | 11/2013 | Liu et al. | |
| 8,582,241 B1 | 11/2013 | Yu et al. | |
| 8,582,253 B1 | 11/2013 | Zheng et al. | |
| 8,588,039 B1 | 11/2013 | Shi et al. | |
| 8,593,914 B2 | 11/2013 | Wang et al. | |
| 8,597,528 B1 | 12/2013 | Roy et al. | |
| 8,599,520 B1 | 12/2013 | Liu et al. | |
| 8,599,657 B1 | 12/2013 | Lee | |
| 8,603,593 B1 | 12/2013 | Roy et al. | |
| 8,607,438 B1 | 12/2013 | Gao et al. | |
| 8,607,439 B1 | 12/2013 | Wang et al. | |
| 8,611,035 B1 | 12/2013 | Bajikar et al. | |
| 8,611,046 B2* | 12/2013 | Wu | G11B 5/1278 360/119.04 |
| 8,611,054 B1 | 12/2013 | Shang et al. | |
| 8,611,055 B1 | 12/2013 | Pakala et al. | |
| 8,614,864 B1 | 12/2013 | Hong et al. | |
| 8,619,512 B1 | 12/2013 | Yuan et al. | |
| 8,625,233 B1 | 1/2014 | Ji et al. | |
| 8,625,941 B1 | 1/2014 | Shi et al. | |
| 8,628,672 B1 | 1/2014 | Si et al. | |
| 8,630,068 B1 | 1/2014 | Mauri et al. | |
| 8,634,280 B1 | 1/2014 | Wang et al. | |
| 8,638,529 B1 | 1/2014 | Leng et al. | |
| 8,643,980 B1 | 2/2014 | Fowler et al. | |
| 8,649,123 B1 | 2/2014 | Zhang et al. | |
| 8,665,561 B1 | 3/2014 | Knutson et al. | |
| 8,670,211 B1 | 3/2014 | Sun et al. | |
| 8,670,213 B1 | 3/2014 | Zeng et al. | |
| 8,670,214 B1 | 3/2014 | Knutson et al. | |
| 8,670,294 B1 | 3/2014 | Shi et al. | |
| 8,670,295 B1 | 3/2014 | Hu et al. | |
| 8,675,307 B2* | 3/2014 | Gao | G11B 5/1278 360/125.03 |
| 8,675,318 B1 | 3/2014 | Ho et al. | |
| 8,675,455 B1 | 3/2014 | Krichevsky et al. | |
| 8,681,594 B1 | 3/2014 | Shi et al. | |
| 8,689,430 B1* | 4/2014 | Chen | G11B 5/11 29/603.12 |
| 8,693,141 B1 | 4/2014 | Elliott et al. | |
| 8,703,397 B1 | 4/2014 | Zeng et al. | |
| 8,705,205 B1 | 4/2014 | Li et al. | |
| 8,711,518 B1 | 4/2014 | Zeng et al. | |
| 8,711,528 B1 | 4/2014 | Xiao et al. | |
| 8,717,709 B1 | 5/2014 | Shi et al. | |
| 8,720,044 B1 | 5/2014 | Tran et al. | |
| 8,721,902 B1 | 5/2014 | Wang et al. | |
| 8,724,259 B1 | 5/2014 | Liu et al. | |
| 8,749,790 B1 | 6/2014 | Tanner et al. | |
| 8,749,920 B1 | 6/2014 | Knutson et al. | |
| 8,753,903 B1 | 6/2014 | Tanner et al. | |
| 8,760,807 B1 | 6/2014 | Zhang et al. | |
| 8,760,818 B1 | 6/2014 | Diao et al. | |
| 8,760,819 B1 | 6/2014 | Liu et al. | |
| 8,760,822 B1 | 6/2014 | Li et al. | |
| 8,760,823 B1 | 6/2014 | Chen et al. | |
| 8,763,235 B1 | 7/2014 | Wang et al. | |
| 8,780,498 B1 | 7/2014 | Jiang et al. | |
| 8,780,505 B1 | 7/2014 | Xiao | |

(56) References Cited

U.S. PATENT DOCUMENTS

| | | |
|---|---|---|
| 8,784,674 B2 | 7/2014 | Wu et al. |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 8,810,964 B2 * | 8/2014 | Gao ............... G11B 5/1278 360/125.3 |
| 8,813,324 B2 | 8/2014 | Emley et al. |
| 8,830,625 B2 * | 9/2014 | Linville ............ G11B 5/1278 360/125.3 |
| 8,830,626 B2 * | 9/2014 | Heim ................ G11B 5/3116 360/125.3 |
| 8,830,628 B1 | 9/2014 | Zhang et al. |
| 8,837,088 B1 | 9/2014 | Kimura et al. |
| 8,929,027 B1 * | 1/2015 | Sugiyama ......... G11B 5/3116 360/125.01 |
| 8,988,824 B1 | 3/2015 | Brinkman et al. |
| 8,995,087 B1 * | 3/2015 | Chen ................... G11B 5/11 360/125.03 |
| 9,013,830 B2 | 4/2015 | Guan |
| 9,218,824 B2 * | 12/2015 | Linville ............ G11B 5/1278 |
| 9,281,825 B2 * | 3/2016 | Azenkot .............. H03L 7/06 |
| 9,305,583 B1 * | 4/2016 | Zhang ................ G11B 5/855 |
| 2006/0044681 A1 | 3/2006 | Le et al. |
| 2006/0082924 A1 | 4/2006 | Etoh et al. |
| 2009/0168241 A1 * | 7/2009 | Mochizuki ........ G11B 5/3116 360/125.03 |
| 2010/0061016 A1 | 3/2010 | Han et al. |
| 2010/0290157 A1 | 11/2010 | Zhang et al. |
| 2011/0086240 A1 | 4/2011 | Xiang et al. |
| 2012/0012555 A1 | 1/2012 | Yan et al. |
| 2012/0111826 A1 | 5/2012 | Chen et al. |
| 2012/0216378 A1 | 8/2012 | Emley et al. |
| 2012/0237878 A1 | 9/2012 | Zeng et al. |
| 2012/0298621 A1 | 11/2012 | Gao |
| 2013/0216702 A1 | 8/2013 | Kaiser et al. |
| 2013/0216863 A1 | 8/2013 | Li et al. |
| 2013/0242431 A1 * | 9/2013 | Hosomi ............... G11B 5/235 360/119.02 |
| 2013/0257421 A1 | 10/2013 | Shang et al. |
| 2013/0272104 A1 * | 10/2013 | Gao .................... B82Y 10/00 369/13.33 |
| 2014/0154529 A1 | 6/2014 | Yang et al. |
| 2014/0175050 A1 | 6/2014 | Zhang et al. |
| 2014/0177091 A1 * | 6/2014 | Urakami ............ G11B 5/1278 360/75 |
| 2014/0353276 A1 | 12/2014 | Mao et al. |
| 2014/0362468 A1 * | 12/2014 | Taguchi ............. G11B 5/1278 360/99.08 |
| 2015/0029616 A1 * | 1/2015 | Bai .................... G11B 5/1278 360/236.5 |
| 2015/0085402 A1 | 3/2015 | Bashir et al. |

* cited by examiner

SHINGLE MAGNETIC WRITER HAVING NONCONFORMAL SHIELDS

BACKGROUND

In order to record data at higher areal densities, shingle magnetic recording may be used. FIG. 1 depicts an airbearing surface (ABS) view of a conventional magnetic recording system 10 including conventional pole 20 that can implement a shingle magnetic recording scheme. In addition to the write pole 20, the field 22 for the conventional pole 20 is also shown. In a shingle magnetic recording scheme, successive tracks overwrite previous tracks in only one direction. FIG. 1 thus depicts tracks 30, 32, 34 and 36 having bits written by field 22 of the main pole 20. The track 30 is written first, followed, in order, by the tracks 32, 34 and 36. Using the shingle magnetic writing scheme, the magnetic pole 20 having a relatively large pole tip geometry may be used to write at a higher areal density.

Although the conventional magnetic recording system 10 functions for shingle magnetic recording, there are drawbacks. In particular, the pole 20 may have stringent requirements for the track edge and reduced track curvature. Thus, side shields (not shown) separated from the pole 20 by small side gaps may be required. Issues such as wide area track erasure degradation, the concentration of magnetic flux at the side shields, write field loss due to the small side gap, and increased rise time may also adversely affect performance of the conventional magnetic recording system 20. Accordingly, what is needed is a system and method for improving the performance of a magnetic recording head, particularly for shingle magnetic recording.

DETAILED DESCRIPTION OF THE PREFERRED EMBODIMENTS

While the various embodiments disclosed are applicable to a variety of data storage devices such as magnetic recording disk drives, solid-state hybrid disk drives, networked storage systems, for the purposes of illustration the description below uses disk drives as examples.

Figure 1:
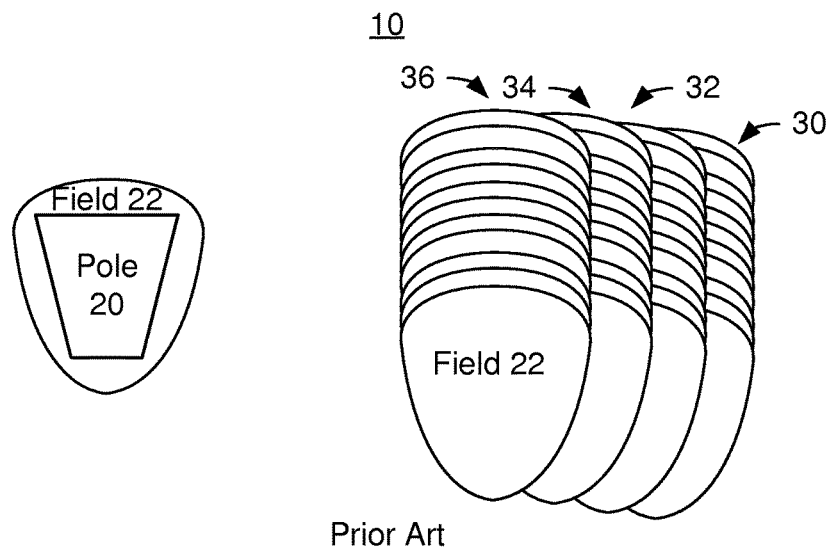
FIG. 1 depicts an ABS view of a conventional magnetic recording system that may implement shingle magnetic recording.
Figure 2A:
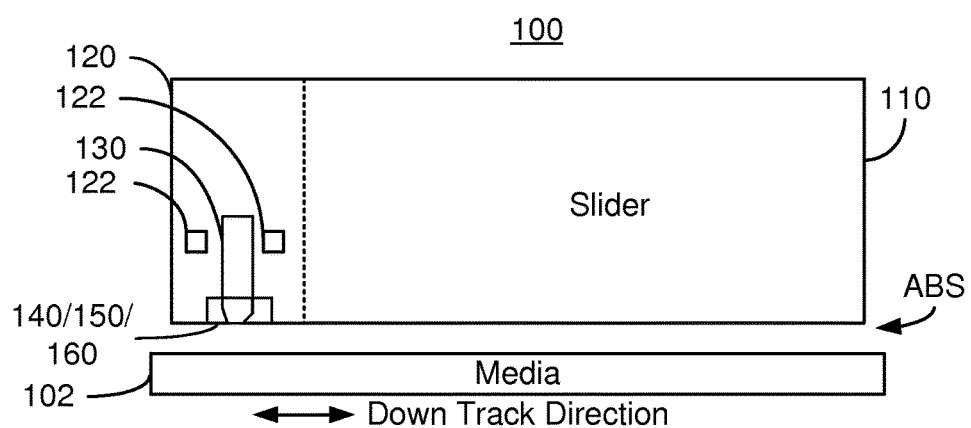
FIGS. 2A and 2B depict side and ABS views of an exemplary embodiment of a magnetic recording disk drive usable in shingle magnetic recording.
Figure 2B:
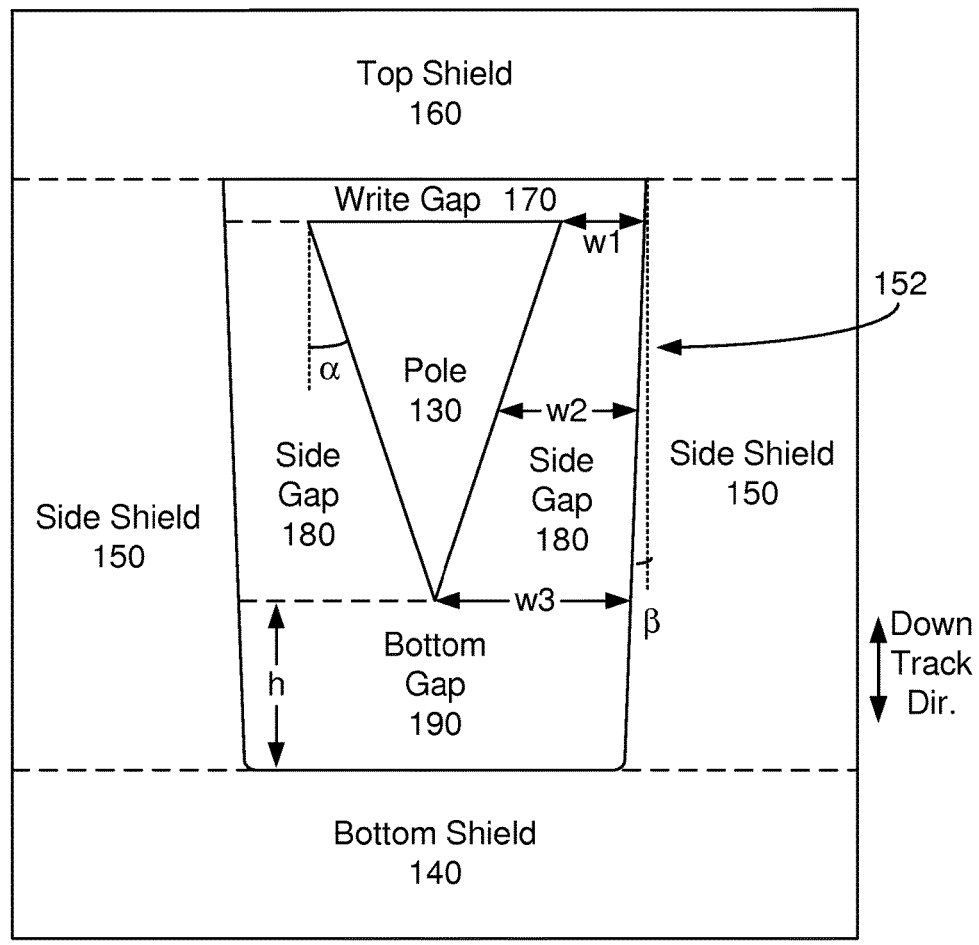

FIGS. 2A and 2B depict side and ABS views of a write apparatus usable in shingle magnetic recording. In the embodiment shown, the write apparatus is a disk drive 100 usable in shingle magnetic recording. FIG. 2A depicts a side view of the disk drive 100. FIG. 2B depicts an ABS view of a portion of the disk drive 100. For clarity, FIGS. 2A-2B are not to scale. For simplicity not all portions of the disk drive 100 are shown. In addition, although the disk drive 100 is depicted in the context of particular components other and/or different components may be used. For example, circuitry used to drive and control various portions of the disk drive is not shown. Only single components are shown. However, multiples of each components and/or their sub-components, might be used. The disk drive 100 may be a perpendicular magnetic recording (PMR) disk drive. However, in other embodiments, the disk drive 100 may be configured for other types of magnetic recording. The disk drive 100 may also use a shingle magnetic recording scheme. However, in other embodiments, other recording schemes may be used. The disk drive 100 typically includes the write transducer 120 and a read transducer. However, only the write transducer 120 is depicted.

The disk drive 100 includes a media 102, and a slider 110 on which a transducer 120 has been fabricated. Although not shown, the slider 110 and thus the transducer 120 are generally attached to a suspension. In general, the slider 110 includes the write transducer 120 and a read transducer (not shown). However, for clarity, only the write transducer 120 is shown.

The transducer 120 includes coil(s) 122, a pole 130, optional bottom shield 140, side shields 150, top shield 160, write gap 170, side gap 180 and bottom gap 190. The pole 130 is magnetic and may have a high saturation magnetization greater than 2.0T. The pole 130 has a pole tip region including bottom and a top wider than the bottom. A portion of the pole tip 130 occupies the ABS and is shown in FIG. 2B. Thus, for the purposes of ABS views herein, the terms "pole" and "pole tip" are used interchangeably. Thus, the sides of the pole 130 are at a sidewall angle, $\alpha$, from a down track direction. Because the top of the pole 130 is wider than the bottom, the sidewall angle is nonzero. In the embodiment shown, the bottom of pole tip is an edge. Thus, the pole tip 130 forms a triangle at the ABS. Other shapes are possible. For example, the pole tip 130 may be trapezoidal with the longer of the two parallel sides being the top of the pole 130. The top of the pole 130 is adjacent to the write gap 170. In some embodiments, the sidewall angle is not more than fifteen degrees. In some such embodiments, the sidewall angle is at least twelve degrees. In other embodiments, the sidewall angle is not more than nine degrees. In some such embodiments, the sidewall angle is at least four degrees. Other sidewall angles are possible.

In the embodiment shown, a top shield 160 is separated from the pole 130 by the write gap 170. The side shields 150 are separated from the sidewalls of the pole 130 by side gaps 180. The bottom shield 140 is separated from the bottom of the pole 130 by a bottom gap 190. In embodiments in which the bottom shield 140 is omitted, the bottom gap 190 may separate the bottom of the pole tip 130 from underlying structures. The gaps 170, 180 and 190 are nonmagnetic. At least some of the gaps 170, 180 and 190 include nonmagnetic insulators. However, other materials may be used.

The side shields 150 are magnetically connected with the top shield 160 and extend past the bottom of the pole tip 130 by a distance, h. h is nonzero and substantially the height of the bottom gap 190 in the case where a bottom shield 140 is present. The side gap 180 is between the side shields 150 and the pole tip 130.

The side shields 150 have pole-facing surfaces 152 oriented at a side shield angle, $\beta$, from the down track direction. The side shield angle is less than the sidewall angle ($\beta<\alpha$). The side shield angle is such that the spacing between the side shields and the pole 130 at the bottom shield 140 is larger than at the top shield 160. Note that if the side shield angle was the same as the sidewall angle $\alpha$, the spacing between the side shields 150 would be the same at the top shield 160 and bottom shield 140. Thus, the side shields 150 are not conformal with the pole 130 and are configured such that the bottom of the side shields 150 are further from the pole 130 than the top of the side shields 150. In some embodiments, the side shield angle is not more than one-half of the sidewall angle ($\beta\leq\alpha/2$). Thus, the width of the side gap 180 monotonically increases (increases without decreasing) from the top of the pole tip 130 toward the bottom of the pole top 130. In some such embodiments, the side shield angle is not more than one-third of the sidewall angle ($\beta\leq\alpha/3$). Thus, in some embodiments, the side shield angle is not more than five degrees from the down track direction. In some such embodiments, the side shield angle is not less than two degrees from the down track direction (2 degrees$\leq\beta\leq5$ degrees). Thus, the pole-facing surfaces 152 are close to or at vertical (close to or at parallel to the down track direction). Although the side shield angle is shown in a particular direction from the down track direction in FIG. 2B, in other embodiments, the side shield angle may be in the opposite direction from the down track direction. The side shield angle being not more than a particular value means that the side shield walls are within that particular value in either direction from the down track direction. For example, in embodiments in which the side shield angle is not more than two degrees from the down track direction, the pole-facing surfaces 152 of the side shields 150 may be angled closer to the down track direction by the angle $\beta$ or may be angled further from the pole 130 by the angle $\beta$.

Because of the relationship between the sidewall angle, $\alpha$, and the side shield angle, $\beta$, the side gap 180 has a varying width. Near the top of the pole tip 130, the side gap 180 has a width, w1. The width increases to a width w2. At the bottom of the pole tip 130, the width is the largest w3 (w1$\leq$w2$\leq$w3). Further, the side gap at the trailing edge (top) may be thin. In some embodiments, w1 is not more than one and one half multiplied by the thickness of the write gap 170. The side gap width w1 may be not more than forty nanometers. In the embodiment shown, w1 may be at least fifteen nanometers and not more than thirty-five nanometers. In some such embodiments, the side gap 180 is not larger than twenty-five nanometers at its top (w1$\leq$25 nm). In addition to the increasing size of the side gaps 180 towards the bottom of the pole tip 130, the bottom gap 190 is larger than the bottom of the side gap (w3<h). In some embodiments, h is on the order of one hundred nanometers. Because of the geometry of the pole 130 and side shields 150, the side gap remains thin near the top of the pole tip 130/write gap 170. This is the region at which the transducer 120 writes to the media 102. Thus, the small side gap 180 for writing, which is desirable for shingle magnetic recording, is preserved.

The disk drive 100 may have improved performance in shingle magnetic recording. The configuration of the pole 130 and side shields 150 may enhance shingle writing. For example, a small side gap (w1) at the trailing edge (top) of the pole 130 may improve track edge writing and erasing. Thus, writer flux leakage may be mitigated. Use of the bottom (leading) shield 140 may reduce flux shunting, thereby improving writeability. Wide area track erasure (WATER) may also be improved. The field rise time, data rate and field gradient may also be improved. Performance of the disk drive 100 may thus be improved.

Figure 3:
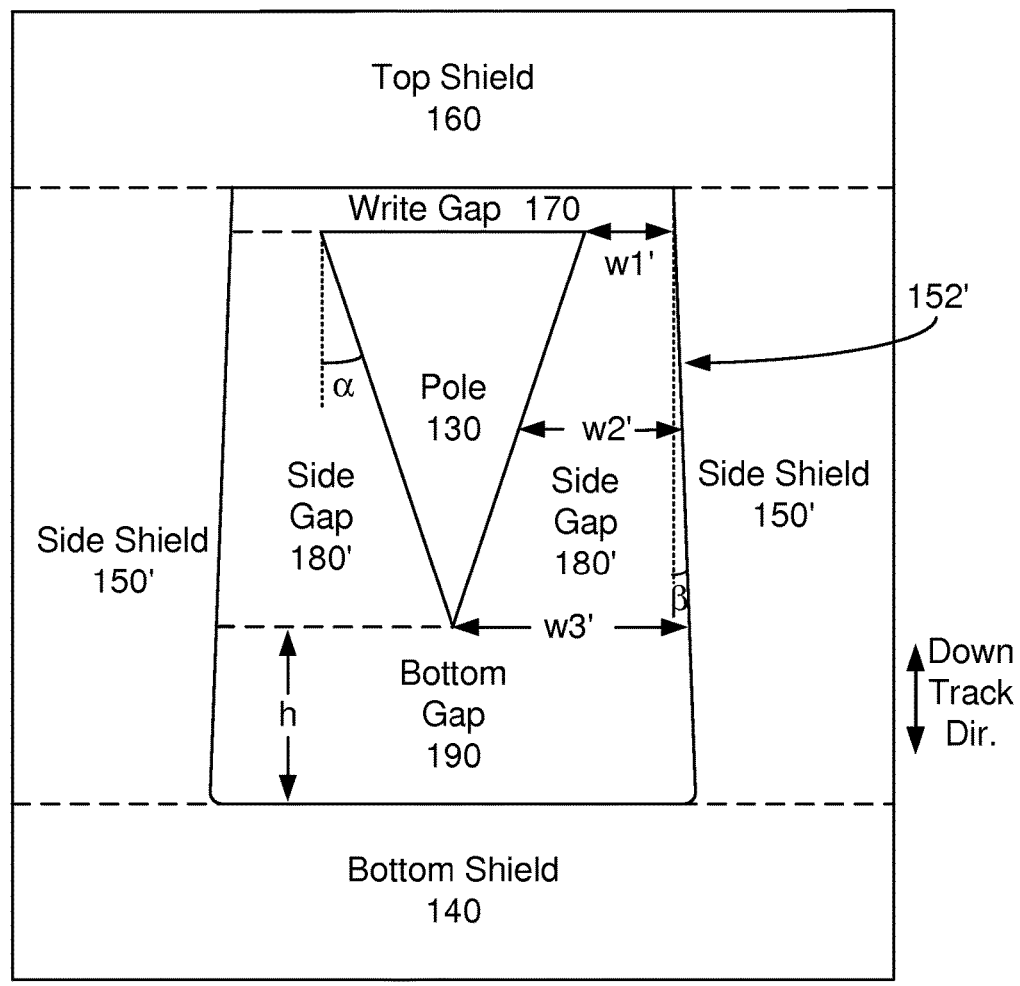
FIG. 3 depicts an ABS view of another exemplary embodiment of a magnetic recording disk drive usable in shingle magnetic recording.

FIG. 3 depicts an ABS view of another embodiment of a disk drive 100' and transducer 120' that are suitable for use in shingle magnetic recording. For clarity, FIG. 3 is not to scale. For simplicity not all portions of the disk drive 100' are shown. In addition, although the disk drive 100' is depicted in the context of particular components other and/or different components may be used. For example, circuitry used to drive and control various portions of the disk drive is not shown. For simplicity, only single components are shown. However, multiples of each components and/or their sub-components, might be used. The disk drive 100' may be a PMR disk drive. However, in other embodiments, the disk drive 100' may be configured for other types of magnetic recording. The disk drive 100' may also use a shingle magnetic recording scheme. However, in other embodiments, other recording schemes may be used. The disk drive 100' typically includes the write transducer 120' and a read transducer. However, only the write transducer 120' is depicted. The disk drive 100' and transducer 120' correspond to the disk drive 100 and transducer 120, respectively. Consequently, analogous components are labeled similarly. For example, the transducer 120' includes a write pole 130, bottom shield 140, side shields 150', top shield 160, write gap 170, side gap 180' and bottom gap 190. The structure and function of the components 130, 140, 150', 160, 170, 180' and 190 are analogous to those of the components 130, 140, 150, 160, 170, 180 and 190, respectively, of the write transducer 120.

The pole 130 has a pole tip region including bottom and a top wider than the bottom and which may occupy part of the ABS as shown in FIG. 3. The top of the pole 130 is adjacent to the write gap 170. Thus, the sides of the pole 130 are at a sidewall angle, $\alpha$, from a down track direction. In the embodiment shown, the bottom of pole tip is an edge. Thus, the pole tip 130 forms a triangle at the ABS. Other shapes are possible having a top wider than the bottom are possible. For example, the pole tip 130 may be trapezoidal. In some embodiments, the sidewall angle is at least twelve degrees and not more than fifteen degrees. In other embodiments, the sidewall angle is at least four degrees and not more than nine degrees. Other sidewall angles are possible.

The side shields 150' have pole-facing surfaces 152' oriented at a side shield angle, $\beta$, from the down track direction. The side shield angle is less than the sidewall angle ($\beta<\alpha$). The side shields 150' are not conformal with the pole 130. The bottom of the side shields 150' are further from the pole 130 than the top of the side shields 150'. For the side shields 150', the sidewall angle is in the opposite direction from the down track direction than for the side shields 150. Thus, the spacing between the side shields 150' at the bottom shield is greater than at the top shield. The relationship between the sidewall angle and the side shield angle may be the same for the transducer 120' as for the transducer 120. For example, in some embodiments, the side shield angle is not more than one-half of the sidewall angle ($\beta\leq\alpha/2$). The width of the side gap 180' may also monotonically increase from the top of the pole tip 130 toward the bottom of the pole top 130. In some such embodiments, the side shield angle is not less than two degrees from the down track direction (2 degrees≤β≤5 degrees). Thus, the pole-facing surfaces 152' are close to or at vertical (close to or at parallel to the down track direction). The side shields 150' are also magnetically coupled with the top shield 160.

Because of the relationship between the sidewall angle, α, and the side shield angle, β, the side gap 180 has a varying width. Near the top of the pole tip 130, the side gap 180 has a width, w1' which may be almost the same as the width w1 in FIG. 2B. The width increases to a width w2'. This width is greater than for the width w2 of FIG. 2B. At the bottom of the pole tip 130, the width is the largest w3' (w1'≤w2'≤w3'). This width is also greater than the width w3 depicted in FIG. 2B. In other words, w1'≈w1, w2'>w2, w3'>w3, w1'≤w2'≤w3' and w1≤w2≤w3. Further, the side gap 180' at the trailing edge (top) may be thin. In some embodiments, w1' is not more than one and one half multiplied by the thickness of the write gap 170. The side gap width w1' may be not more than forty nanometers. In the embodiment shown, w1' may be at least fifteen nanometers and not more than thirty-five nanometers. In some such embodiments, the side gap 180' is not larger than twenty-five nanometers at its top (w1≤25 nm). In addition to the increasing size of the side gaps 180', the bottom gap 190 is larger than the bottom of the side gap (w3'<h). In some embodiments, h is on the order of one hundred nanometers.

The disk drive 100' may share the benefits of the disk drive 100. The configuration of the pole 130 and side shields 150' may improve track edge writing and erasing, may reduce writer flux leakage, may reduce flux shunting, may thereby improving writeability and improve WATER. The field rise time, data rate and field gradient may also be improved. Performance of the disk drive 100' may thus be improved for shingle recording.

Figure 4:
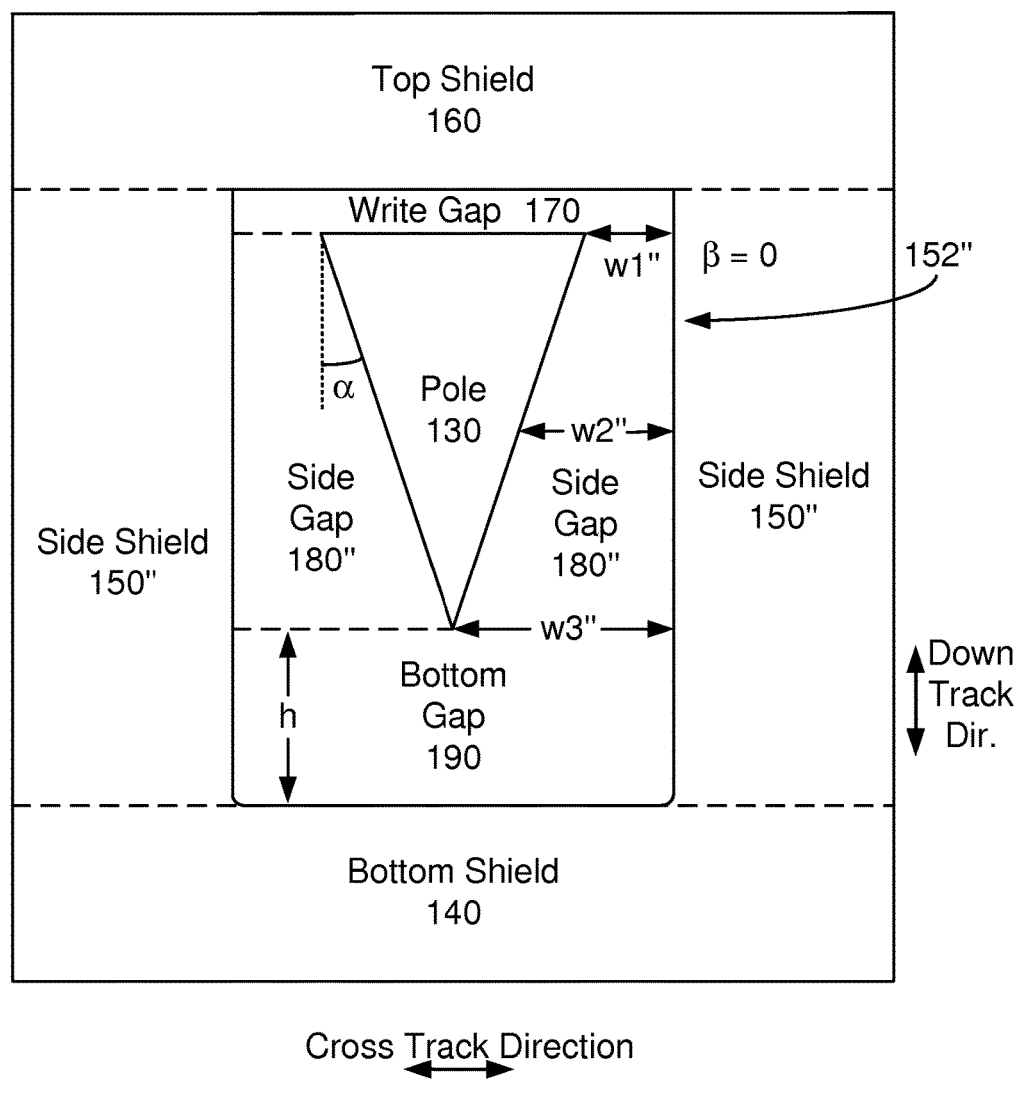
FIG. 4 depicts an ABS view of another exemplary embodiment of a magnetic recording disk drive usable in shingle magnetic recording.

FIG. 4 depicts an ABS view of another embodiment of a disk drive 100" and transducer 120" that are suitable for use in shingle magnetic recording. For clarity, FIG. 4 is not to scale. For simplicity not all portions of the disk drive 100" are shown. In addition, although the disk drive 100" is depicted in the context of particular components other and/or different components may be used. For example, circuitry used to drive and control various portions of the disk drive is not shown. For simplicity, only single components are shown. However, multiples of each components and/or their sub-components, might be used.

The disk drive 100" may be a PMR disk drive. However, in other embodiments, the disk drive 100" may be configured for other types of magnetic recording. The disk drive 100" may also use a shingle magnetic recording scheme. However, in other embodiments, other recording schemes may be used. The disk drive 100" typically includes the write transducer 120" and a read transducer. However, only the write transducer 120" is depicted. The disk drive 100" and transducer 120" correspond to the disk drives 100/100' and transducer 120/120', respectively. Consequently, analogous components are labeled similarly. For example, the transducer 120" includes a write pole 130, bottom shield 140, side shields 150", top shield 160, write gap 170, side gap 180" and bottom gap 190. The structure and function of the components 130, 140, 150", 160, 170, 180" and 190 are analogous to those of the components 130, 140, 150/150', 160, 170, 180/180' and 190, respectively, of the write transducer 120/120'.

The pole 130 has a pole tip region including bottom and a top wider than the bottom. Thus, the sides of the pole tip 130 are at a sidewall angle, a, from a down track direction. In the embodiment shown, the bottom of pole tip is an edge. Thus, the pole tip 130 forms a triangle at the ABS. Other shapes are possible having a top wider than the bottom are possible. In some embodiments, the sidewall angle is at least twelve degrees and not more than fifteen degrees. In other embodiments, the sidewall angle is at least four degrees and not more than nine degrees. Other sidewall angles are possible.

The side shields 150" have pole-facing surfaces 152" oriented at a side shield angle, β, from the down track direction. In the embodiment shown in FIG. 4, β=0. Thus, the pole-facing surfaces 152" of the side shield 150" are substantially parallel to the down track direction. Because the top of the pole 130 is wider than the bottom, the sidewall angle is nonzero. The side shield angle is less than the sidewall angle (0=β<α). The side shields 150" are not conformal with the pole 130. The bottom of the side shields 150" are further from the pole 130 than the top of the side shields 150". The spacing between the side shields 150" at the bottom shield 140 is the same as at the top shield 160. The width of the side gap 180" may also monotonically increase from the top of the pole tip 130 toward the bottom of the pole top 130. The side shields 150" are also magnetically coupled with the top shield 160.

Because of the relationship between the sidewall angle, α, and the side shield angle, β, the side gap 180" has a varying width. Near the top of the pole tip 130, the side gap 180 has a width, w1" which may be almost the same as the width w1 in FIG. 2B. The width increases to a width w2". This width is greater than for the width w2 of FIG. 2B. At the bottom of the pole tip 130, the width is the largest w3" (w1"≤w2"≤w3"). In some embodiments, w1" is not more than one and one half multiplied by the thickness of the write gap 170. The side gap width w1" may be not more than forty nanometers. In the embodiment shown, w1" may be at least fifteen nanometers and not more than thirty-five nanometers. In some such embodiments, the side gap 180" is not larger than twenty-five nanometers at its top (w1"≤25 nm). In addition to the increasing size of the side gaps 180", the bottom gap 190 is larger than the bottom of the side gap (w3'<h). In some embodiments, h is on the order of one hundred nanometers.

The disk drive 100" may share the benefits of the disk drive(s) 100 and 100'. The configuration of the pole 130 and side shields 150" may improve track edge writing and erasing, may reduce writer flux leakage, may reduce flux shunting, may thereby improving writeability and improve WATER. The field rise time, data rate and field gradient may also be improved. Performance of the disk drive 100' may thus be improved for shingle recording.

Figure 5:
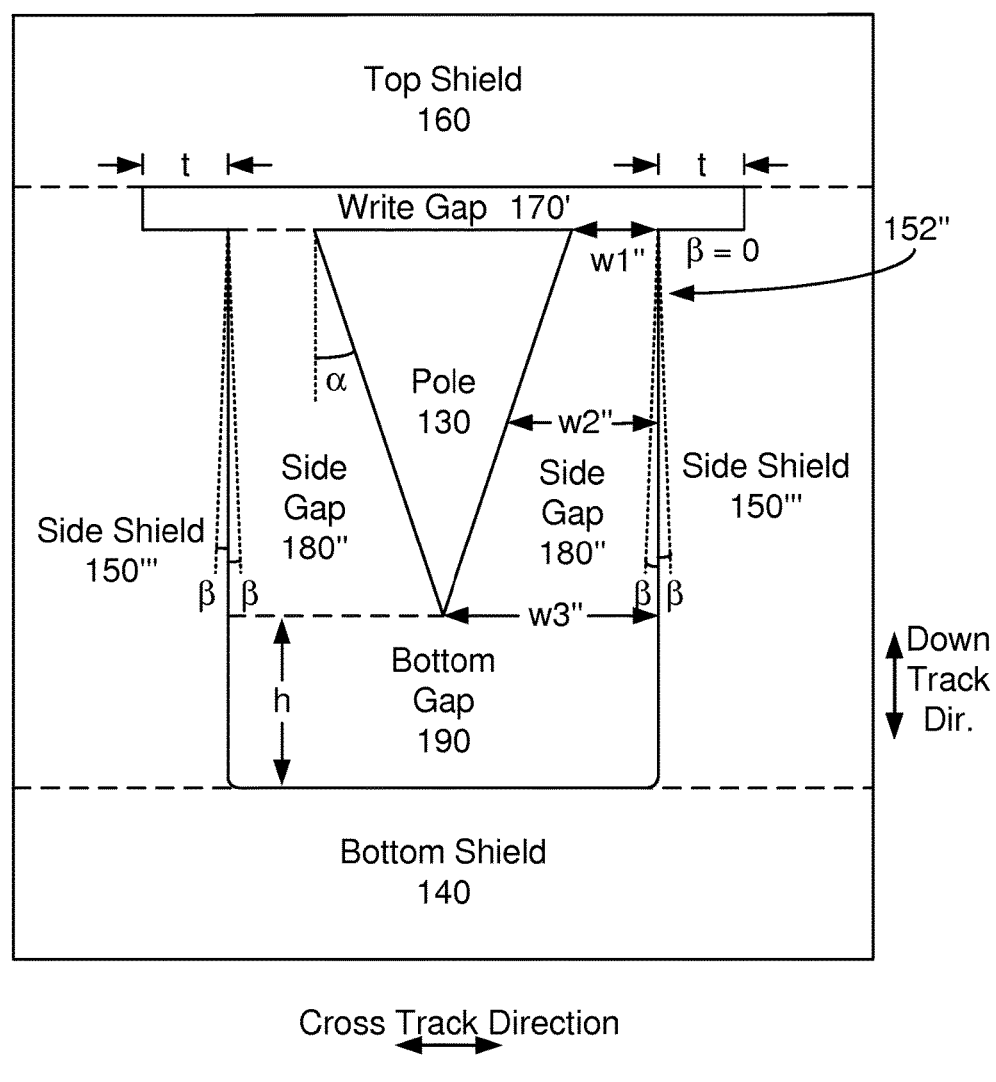
FIG. 5 depicts an ABS view of another exemplary embodiment of a magnetic recording disk drive usable in shingle magnetic recording.

FIG. 5 depicts an ABS view of another embodiment of a disk drive 100''' and transducer 120''' that are suitable for use in shingle magnetic recording. For clarity, FIG. 5 is not to scale. For simplicity not all portions of the disk drive 100''' are shown. In addition, although the disk drive 100''' is depicted in the context of particular components other and/or different components may be used. For example, circuitry used to drive and control various portions of the disk drive is not shown. For simplicity, only single components are shown. However, multiples of each components and/or their sub-components, might be used.

The disk drive 100''' may be a PMR disk drive. However, in other embodiments, the disk drive 100''' may be configured for other types of magnetic recording. The disk drive 100''' may also use a shingle magnetic recording scheme. However, in other embodiments, other recording schemes may be used. The disk drive 100''' typically includes the write transducer 120''' and a read transducer. However, only the write transducer 120'''' is depicted. The disk drive 100'''' and transducer 120''' correspond to the disk drives 100/100'/100'' and transducer 120/120'/120'', respectively. Consequently, analogous components are labeled similarly. For example, the transducer 120''' includes a write pole 130, bottom shield 140, side shields 150''', top shield 160, write gap 170', side gap 180'' and bottom gap 190. The structure and function of the components 130, 140, 150''', 160, 170, 180'' and 190 are analogous to those of the components 130, 140, 150/150', 160, 170, 180/180' and 190, respectively, of the write transducer 120/120'/120''.

The pole 130 has a pole tip region including bottom and a top wider than the bottom. Thus, the sides of the pole tip 130 are at a sidewall angle, a, from a down track direction. In the embodiment shown, the bottom of pole tip is an edge. Thus, the pole tip 130 forms a triangle at the ABS. Other shapes are possible having a top wider than the bottom are possible. In some embodiments, the sidewall angle is at least twelve degrees and not more than fifteen degrees. In other embodiments, the sidewall angle is at least four degrees and not more than nine degrees. Other sidewall angles are possible.

The side shields 150''' have pole-facing surfaces 152'''. In the embodiment shown, the pole-facing surfaces 152''' are in the down track direction (vertical as seen in FIG. 5). Also shown are dashed lines at an angle β from the down track direction. The dashed lines indicate that although shown at a side shield angle of zero degrees, the pole-facing surface 152''' may be oriented at a nonzero side shield angle, β, from the down track direction. The side shield angle and sidewall angle for the transducers 120''' have an analogous relationship to that described above. For example, the side shield angle is less than the sidewall angle (β<α). The side shields 150''' are not conformal with the pole 130. The bottom of the side shields 150'' are further from the pole 130 than the top of the side shields 150''. The side shields 150''' are also magnetically coupled with the top shield 160.

In addition, the write gap 170', side shields 150''' and top shield 160 are configured such that the write gap 170' has an overhang of length t. In some embodiments, the overhang may be small, for example at least twenty nanometers and not more than forty nanometers. In other embodiments, the overhang may be large. For example, the overhang may be at least ninety nanometers and not more than one hundred twenty nanometers. However, other sizes for the overhang are possible.

Because of the relationship between the sidewall angle, α, and the side shield angle, β, the side gap 180'' has a varying width. Near the top of the pole tip 130, the side gap 180 has a width, w1'' which may be almost the same as the width w1 in FIG. 2B. The width increases to a width w2''. This width is greater than for the width w2 of FIG. 2B. At the bottom of the pole tip 130, the width is the largest w3'' (w1''≤w2''≤w3''). In some embodiments, w1'' is not more than thirty nanometers. In some such embodiments, the side gap 180'' is not larger than twenty-five nanometers at its top (w1''≤25 nm). In addition to the increasing size of the side gaps 180', the bottom gap 190 is larger than the bottom of the side gap (w3'<h). In some embodiments, h is on the order of one hundred nanometers.

The disk drive 100''' may share the benefits of the disk drive(s) 100, 100' and 100''. The configuration of the pole 130 and side shields 150''' may improve track edge writing and erasing, may reduce writer flux leakage, may reduce flux shunting, may thereby improving writeability and improve WATER. The field rise time, data rate and field gradient may also be improved. Performance of the disk drive 100' may thus be improved for shingle recording.

Figure 6:
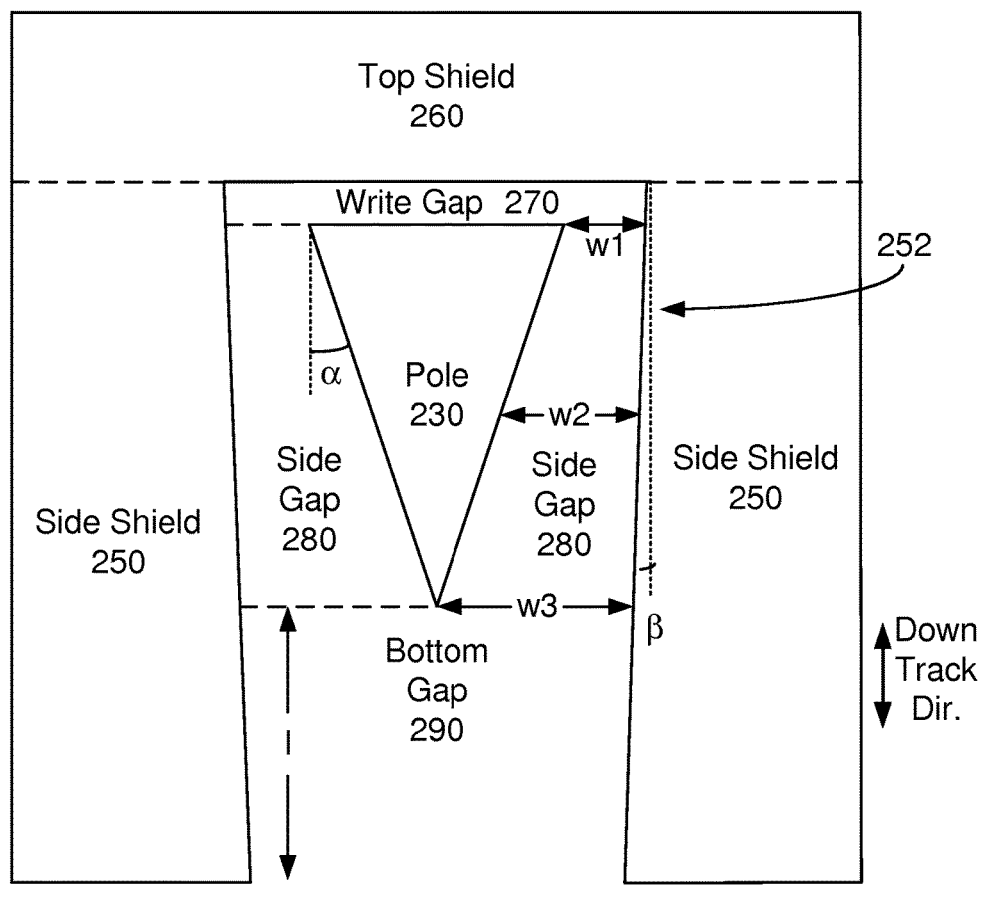
FIG. 6 depicts an ABS view of another exemplary embodiment of a magnetic recording disk drive usable in shingle magnetic recording.

FIG. 6 depicts an ABS view of another embodiment of a disk drive 200 and transducer 220 that are suitable for use in shingle magnetic recording. For clarity, FIG. 6 is not to scale. For simplicity not all portions of the disk drive 200 are shown. In addition, although the disk drive 200 is depicted in the context of particular components other and/or different components may be used. For example, circuitry used to drive and control various portions of the disk drive is not shown. For simplicity, only single components are shown. However, multiples of each components and/or their sub-components, might be used. The disk drive 200 may be a PMR disk drive. However, in other embodiments, the disk drive 200 be configured for other types of magnetic recording. The disk drive 200 may also use a shingle magnetic recording scheme. However, in other embodiments, other recording schemes may be used. The disk drive 200 typically includes the write transducer 220 and a read transducer. However, only the write transducer 220 is depicted. The disk drive 200 and transducer 220 correspond to the disk drive 100/100'/100''/100''' and transducer 120/120'/120''/120''', respectively. Consequently, analogous components are labeled similarly. For example, the transducer 220 includes a write pole 230, side shields 250, top shield 260, write gap 270, side gap 280 and bottom gap 290. The structure and function of the components 230, 250, 260, 270, 280 and 290 are analogous to those of the components 130, 150/150'/150''/150''', 160, 170/170', 180/180'/180''/180''' and 190, respectively, of the write transducers 120/120'/120''/120'''.

The transducer 220 is most analogous to the transducer 120 depicted in FIGS. 2A-2B. This is because the pole-facing surfaces 252 are at a side shield angle, β, with respect to the down track direction and are closer together near the bottom of the pole 230. Thus, the relationship between the sidewall angle, α, and the side shield angle is analogous to what is described above. In some embodiments, the actual values of the side shield angle and sidewall angle are as described above. Thus, the side shields 250 are not conformal with the pole 230. The pole-facing surfaces 252 are also close to or at vertical. The side gap 280 has an increasing width toward the bottom of the pole tip 230. For example, w1≤w2≤w3. In some embodiments, w1 is not more than one and one half multiplied by the thickness of the write gap 270. The side gap width w1 may be not more than forty nanometers. In the embodiment shown, w1 may be at least fifteen nanometers and not more than thirty-five nanometers. In some such embodiments, the side gap 280 is not larger than twenty-five nanometers at its top (w1≤25 nm). The side shields 250 are also magnetically coupled with the top shield 260.

In lieu of a bottom shield, the side shields 250 extend past the bottom of the pole tip 230. In some embodiments, the side shields 250 extend past the bottom of the pole tip 230 by a distance, l, that is at least twice the pole tip height at the ABS and not more than five times the pole tip height at the ABS. In some embodiments, the height of the pole tip 230 is ninety nanometers and the side shields 250 extend past the bottom of the pole tip 230 at the ABS by at least three hundred nanometers and not more than four hundred nanometers.

The disk drive 200 may share the benefits of the disk drives 100, 100', 100'' and/or 100'''. The configuration of the pole 230 and side shields 250 may improve track edge writing and erasing, may reduce writer flux leakage, may reduce flux shunting, may thereby improving writeability and improve WATER. The field rise time, data rate and field gradient may also be improved. Performance of the disk drive 200 may thus be improved for shingle recording. In the disk drive 200, one or more of these benefits may be realized even though the transducer 220 does not include a bottom shield. Instead, the side shield 250 extend a sufficient distance in the down track direction below the bottom of the pole tip 230 that the benefit(s) described herein may be realized.

Figure 7:
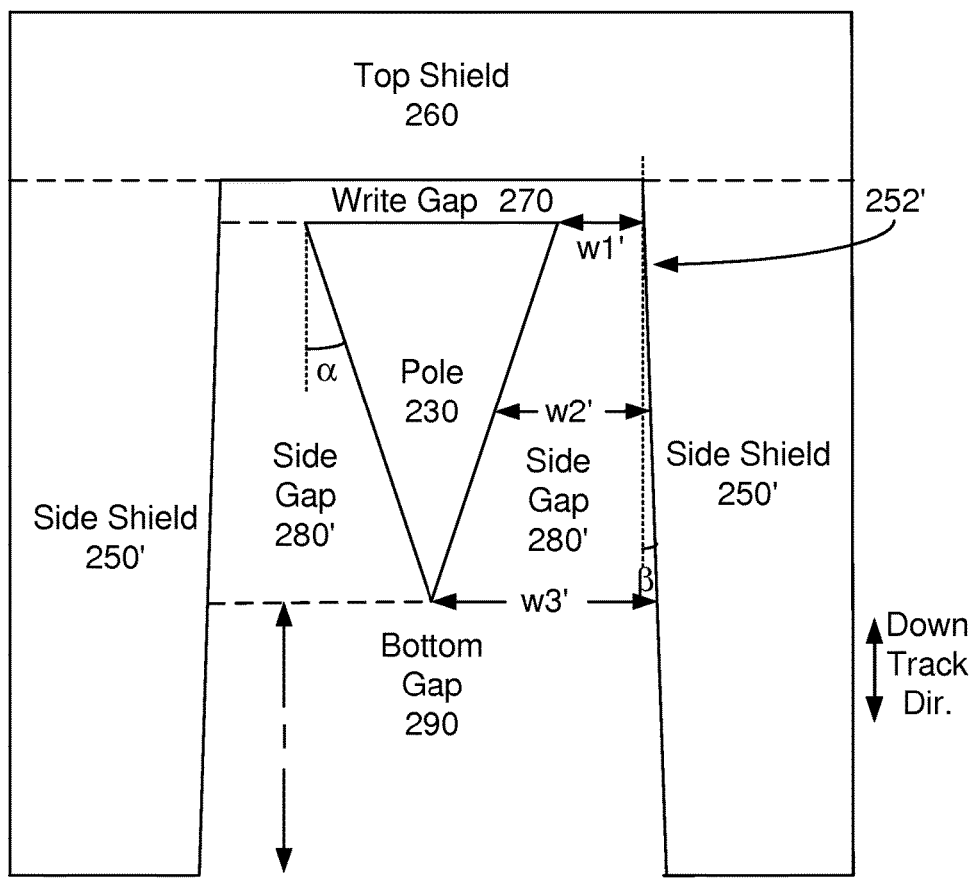
FIG. 7 depicts an ABS view of another exemplary embodiment of a magnetic recording disk drive usable in shingle magnetic recording.

FIG. 7 depicts an ABS view of another embodiment of a disk drive 200' and transducer 220' that are suitable for use in shingle magnetic recording. For clarity, FIG. 7 is not to scale. For simplicity not all portions of the disk drive 200' are shown. In addition, although the disk drive 200' is depicted in the context of particular components other and/or different components may be used. For example, circuitry used to drive and control various portions of the disk drive is not shown. For simplicity, only single components are shown. However, multiples of each components and/or their sub-components, might be used. The disk drive 200' may be a PMR disk drive. However, in other embodiments, the disk drive 200' be configured for other types of magnetic recording. The disk drive 200' may also use a shingle magnetic recording scheme. However, in other embodiments, other recording schemes may be used. The disk drive 200' typically includes the write transducer 220' and a read transducer. However, only the write transducer 220' is depicted. The disk drive 200' and transducer 220' correspond to the disk drive 100/100'/100"/100'" and 200 and to the transducer 120/120'/120"/120"' and 220, respectively. Consequently, analogous components are labeled similarly. For example, the transducer 220' includes a write pole 230, side shields 250', top shield 260, write gap 270, side gap 280' and bottom gap 290. The structure and function of the components 230, 250', 260, 270, 280' and 290 are analogous to those of the components 130 and 230, 150/150'/150"/150'" and 250, 160 and 260, 170/170' and 270, 180/180'/180"/180"' and 280, and 190 and 290, respectively, of the write transducers 120/120'/120"/120"' and 200, respectively.

The transducer 220' is most analogous to the transducers 120' and 220 depicted in FIGS. 3 and 6, respectively. This is because the pole-facing surfaces 252' are at a side shield angle, β, with respect to the down track direction and are further apart near the bottom of the pole 230 and because the bottom shield 140 is omitted. Thus, the relationship between the sidewall angle, α, and the side shield angle is analogous to what is described above. In some embodiments, the actual values of the side shield angle and sidewall angle are as described above. The pole-facing surfaces 252' are also close to or at vertical. Thus, the side shields 250' are not conformal with the pole 230. The side gap 280' has an increasing width toward the bottom of the pole tip 230. For example, w1'≤w2'≤w3'. In some embodiments, w1' is not more than one and one half multiplied by the thickness of the write gap 270. The side gap width w1' may be not more than forty nanometers. In the embodiment shown, w1' may be at least fifteen nanometers and not more than thirty-five nanometers. In some such embodiments, the side gap 280' is not larger than twenty-five nanometers at its top (w1'≤25 nm). The side shields 250' are also magnetically coupled with the top shield 260.

In lieu of a bottom shield, the side shields 250' extend past the bottom of the pole tip 230. In some embodiments, the side shields 250' extend past the bottom of the pole tip 230 by a distance, l, that is at least twice the pole tip height at the ABS and not more than five times the pole tip height at the ABS. In some embodiments, the height of the pole tip 230 is ninety nanometers and the side shields 250' extend past the bottom of the pole tip 230 at the ABS by at least three hundred nanometers and not more than four hundred nanometers.

The disk drive 200' may share the benefits of the disk drives 100, 100', 100", 100'" and/or 200. The configuration of the pole 230 and side shields 250' may improve track edge writing and erasing, may reduce writer flux leakage, may reduce flux shunting, may thereby improving writeability and improve WATER. The field rise time, data rate and field gradient may also be improved. Performance of the disk drive 200' may thus be improved for shingle recording. In the disk drive 200', one or more of these benefits may be realized even though the transducer 220' does not include a bottom shield.

Figure 8:
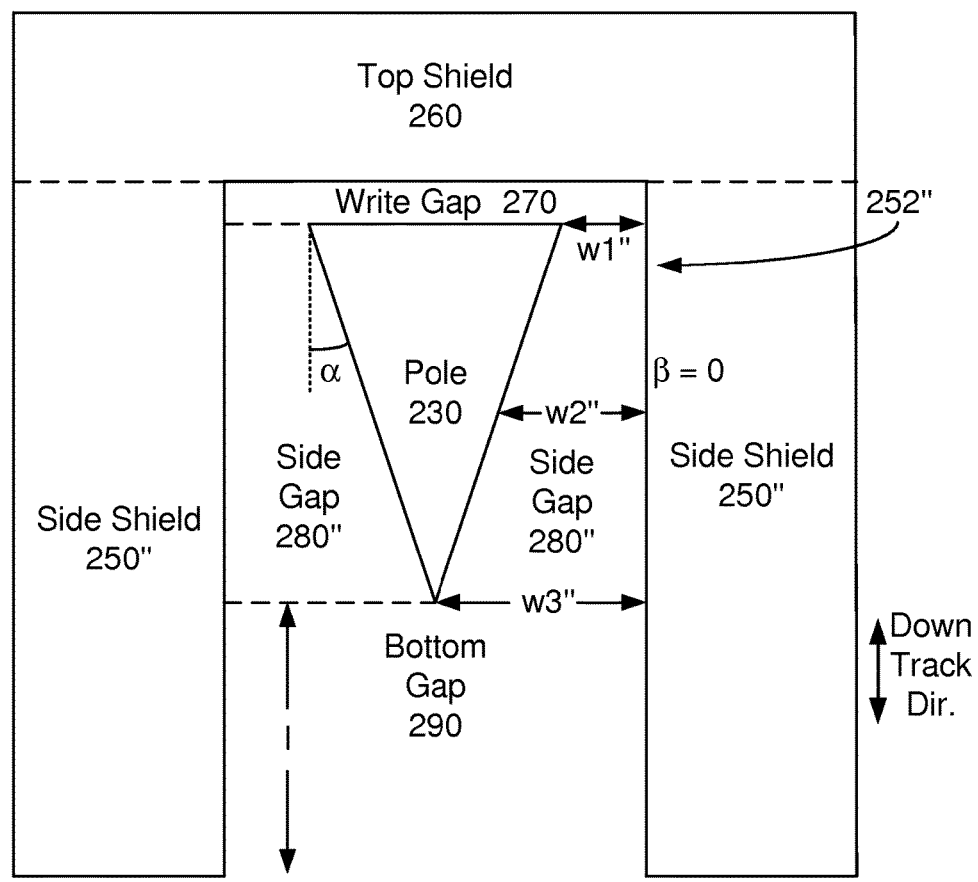
FIG. 8 depicts an ABS view of another exemplary embodiment of a magnetic recording disk drive usable in shingle magnetic recording.

FIG. 8 depicts an ABS view of another embodiment of a disk drive 200" and transducer 220" that are suitable for use in shingle magnetic recording. For clarity, FIG. 8 is not to scale. For simplicity not all portions of the disk drive 200" are shown. In addition, although the disk drive 200" is depicted in the context of particular components other and/or different components may be used. For example, circuitry used to drive and control various portions of the disk drive is not shown. For simplicity, only single components are shown. However, multiples of each components and/or their sub-components, might be used. The disk drive 200" may be a PMR disk drive. However, in other embodiments, the disk drive 200" be configured for other types of magnetic recording. The disk drive 200" may also use a shingle magnetic recording scheme. However, in other embodiments, other recording schemes may be used. The disk drive 200" typically includes the write transducer 220" and a read transducer. However, only the write transducer 220" is depicted. The disk drive 200" and transducer 220" correspond to the disk drive 100/100'/100"/100'" and 200/200' and to the transducer 120/120'/120"/120"' and 220/220', respectively. Consequently, analogous components are labeled similarly. For example, the transducer 220" includes a write pole 230, side shields 250", top shield 260, write gap 270, side gap 280" and bottom gap 290. The structure and function of the components 230, 250", 260, 270, 280" and 290 are analogous to those of the components 130 and 230, 150/150'/150"/150'" and 250/250', 160 and 260, 170/170' and 270, 180/180'/180"/180"' and 280/280', and 190 and 290, respectively, of the write transducers 120/120'/120"/120"' and 200/200', respectively.

The transducer 220" is most analogous to the transducers 120", 220 and 220' depicted in FIGS. 3, 6 and 7, respectively. This is because the pole-facing surfaces 252" are at a side shield angle of zero degrees (β=0) with respect to the down track direction (substantially parallel or vertical) and because the bottom shield 140 is omitted. Thus, the relationship between the sidewall angle, α, and the side shield angle is analogous to what is described above. In some embodiments, the actual values of the side shield angle and sidewall angle are as described above. Thus, the side shields 250" are not conformal with the pole 230. The side gap 280" has an increasing width toward the bottom of the pole tip 230. For example, w1"≤w2"≤w3". In some embodiments, w1" is not more than one and one half multiplied by the thickness of the write gap 270. The side gap width w1" may be not more than forty nanometers. In the embodiment shown, w1" may be at least fifteen nanometers and not more than thirty-five nanometers. In some such embodiments, the side gap 280" is not larger than twenty-five nanometers at its top (w1"≤25 nm). The side shields 250" are also magnetically coupled with the top shield 260.

In lieu of a bottom shield, the side shields 250" extend past the bottom of the pole tip 230. In some embodiments, the side shields 250" extend past the bottom of the pole tip 230 by a distance, l, that is at least twice the pole tip height at the ABS and not more than five times the pole tip height at the ABS. In some embodiments, the height of the pole tip 230 is ninety nanometers and the side shields 250" extend past the bottom of the pole tip 230 at the ABS by at least three hundred nanometers and not more than four hundred nanometers.

The disk drive 200" may share the benefits of the disk drives 100, 100', 100", 100''', 200 and/or 200'. The configuration of the pole 230 and side shields 250" may improve track edge writing and erasing, may reduce writer flux leakage, may reduce flux shunting, may thereby improving writeability and improve WATER. The field rise time, data rate and field gradient may also be improved. Performance of the disk drive 200" may thus be improved for shingle recording. In the disk drive 200", one or more of these benefits may be realized even though the transducer 220" does not include a bottom shield.

Figure 9:
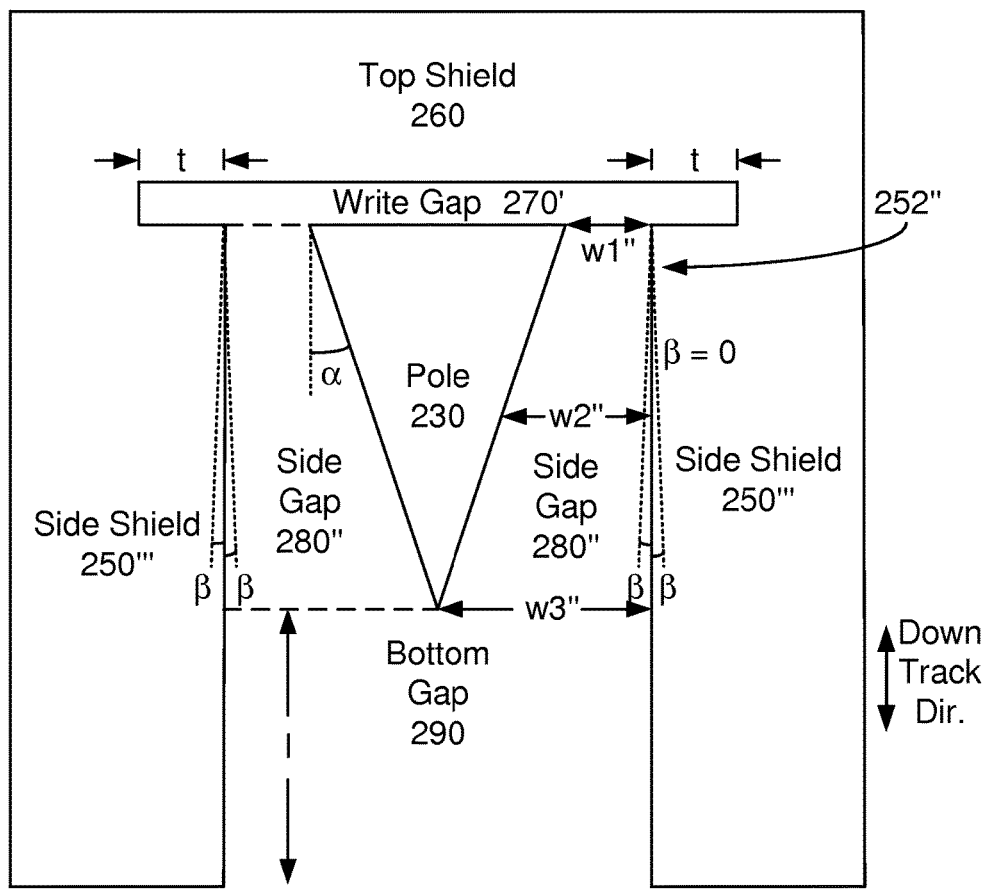
FIG. 9 depicts an ABS view of another exemplary embodiment of a magnetic recording disk drive usable in shingle magnetic recording.

FIG. 9 depicts an ABS view of another embodiment of a disk drive 200''' and transducer 220''' that are suitable for use in shingle magnetic recording. For clarity, FIG. 9 is not to scale. For simplicity not all portions of the disk drive 200''' are shown. In addition, although the disk drive 200''' is depicted in the context of particular components other and/or different components may be used. For example, circuitry used to drive and control various portions of the disk drive is not shown. For simplicity, only single components are shown. However, multiples of each components and/or their sub-components, might be used. The disk drive 200''' may be a PMR disk drive. However, in other embodiments, the disk drive 200''' be configured for other types of magnetic recording. The disk drive 200''' may also use a shingle magnetic recording scheme. However, in other embodiments, other recording schemes may be used. The disk drive 200''' typically includes the write transducer 220''' and a read transducer. However, only the write transducer 220''' is depicted. The disk drive 200''' and transducer 220''' correspond to the disk drive 100/100'/100"/100''' and 200/200'/200" and to the transducer 120/120'/120"/120''' and 220/220'/220", respectively. Consequently, analogous components are labeled similarly. For example, the transducer 220''' includes a write pole 230, side shields 250''', top shield 260, write gap 270', side gap 280" and bottom gap 290. The structure and function of the components 230, 250''', 260, 270', 280" and 290 are analogous to those of the components 130 and 230, 150/150'/150"/150''' and 250/250'/250", 160 and 260, 170/170' and 270, 180/180'/180"/180"' and 280/280'/280', and 190 and 290, respectively, of the write transducers 120/120'/120"/120''' and 200/200'/200", respectively.

The transducer 220''' is most analogous to the transducers 120''', 220, 220' and 220" depicted in FIGS. 3 and 6-8, respectively. This is because the pole-facing surfaces 252" are at a side shield angle of zero degrees (β=0) with respect to the down track direction (substantially parallel or vertical), because the write gap 270' has an overhang, and because the bottom shield 140 is omitted. Thus, the relationship between the sidewall angle, α, and the side shield angle is analogous to what is described above. In some embodiments, the actual values of the side shield angle and sidewall angle are as described above. Thus, the side shields 250''' are not conformal with the pole 230. The side gap 280" has an increasing width toward the bottom of the pole tip 230. For example, w1"≤w2"≤w3". In some embodiments, w1" is not more than one and one half multiplied by the thickness of the write gap 270. The side gap width w1" may be not more than forty nanometers. In the embodiment shown, w1" may be at least fifteen nanometers and not more than thirty-five nanometers. In some such embodiments, the side gap 280" is not larger than twenty-five nanometers at its top (w1"≤25 nm). Although the pole-facing surfaces 252" are shown as being vertical, dashed lines at an angle, β, from the down track direction indicate that the pole-facing surfaces 252" may be within this angle from the down track direction. In other words, the pole-facing surfaces 252" need not be vertical. Instead, they may be a small angle from vertical. In addition, the write gap 270' has an overhang of length t. The overhang has an analogous extent as the overhang of the gap 170'. The side shields 250''' are also magnetically coupled with the top shield 260.

In lieu of a bottom shield, the side shields 250''' extend past the bottom of the pole tip 230. In some embodiments, the side shields 250''' extend past the bottom of the pole tip 230 by a distance, l, that is at least twice the pole tip height at the ABS and not more than five times the pole tip height at the ABS. In some embodiments, the height of the pole tip 230 is ninety nanometers and the side shields 250''' extend past the bottom of the pole tip 230 at the ABS by at least three hundred nanometers and not more than four hundred nanometers.

The disk drive 200''' may share the benefits of the disk drives 100, 100', 100", 100''', 200, 200' and/or 200". The configuration of the pole 230 and side shields 250''' may improve track edge writing and erasing, may reduce writer flux leakage, may reduce flux shunting, may thereby improving writeability and improve WATER. The field rise time, data rate and field gradient may also be improved. Performance of the disk drive 200''' may thus be improved for shingle recording. In the disk drive 200''', one or more of these benefits may be realized even though the transducer 220''' does not include a bottom shield.

Various configurations of the disk drives 100, 100', 100", 100''', 200, 200', 200" and 200''' are shown in FIGS. 2A-9. One of ordinary skill in the art will recognize that various features of the disk drives 100, 100', 100", 100''', 200, 200', 200" and 200''' may be combined in manner(s) not inconsistent with the method and system described herein.

Figure 10:
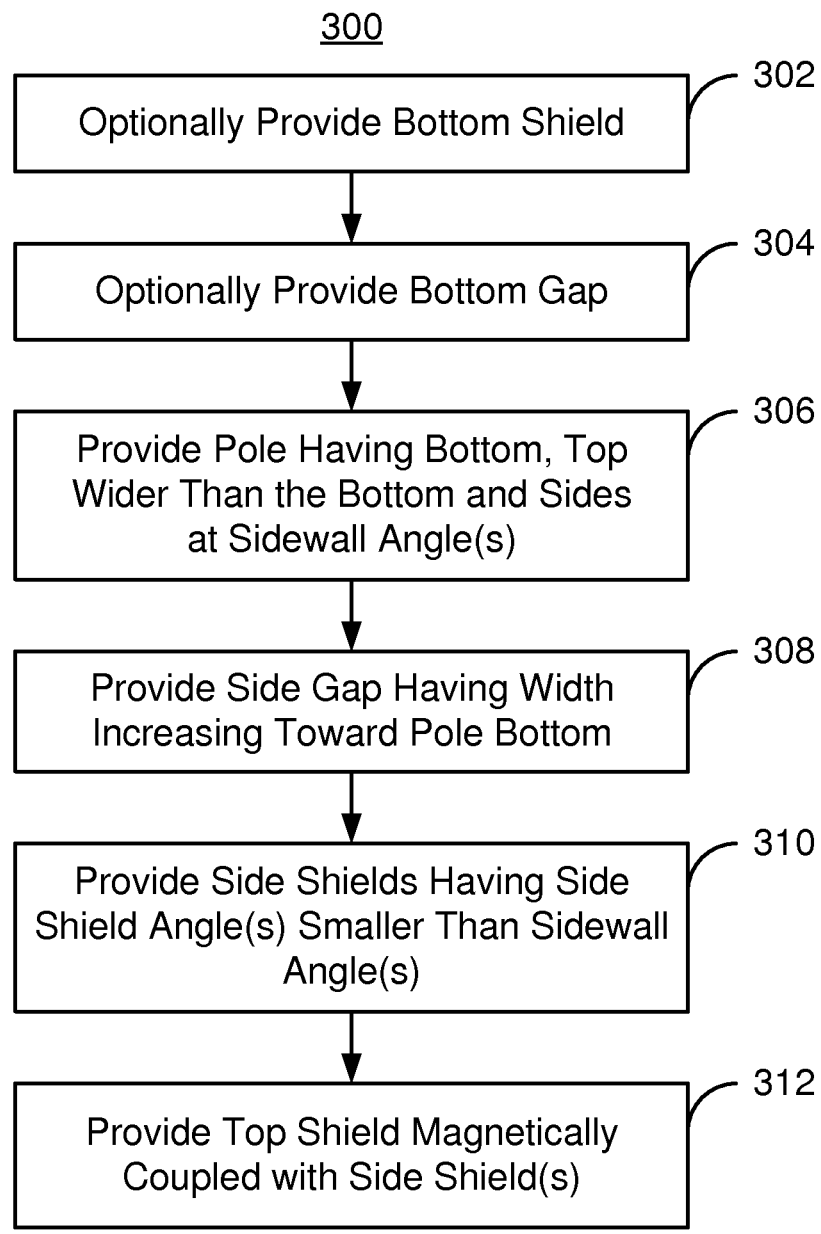
FIG. 10 is a flow chart depicting an exemplary embodiment of a method for fabricating a magnetic recording disk drive usable in shingle magnetic recording.

FIG. 10 depicts an exemplary embodiment of a method 300 for providing a magnetic write apparatus such as a magnetic disk drive. However, other magnetic recording devices may be fabricated. For simplicity, some steps may be omitted, interleaved, combined and/or performed in another order. The method 300 is described in the context of providing a single magnetic recording transducer. However, the method 300 may be used to fabricate multiple magnetic recording transducers at substantially the same time. The method 300 is also described in the context of particular structures. A particular structure may include multiple materials, multiple substructures and/or multiple sub-layers. The method 300 is described in the context of the disk drive 100. However, the method 300 may be used in fabricating other disk drives including but not limited to the disk drives 100', 100", 100''', 200, 200', 200" and/or 200'''. The method 300 also may start after other portions of the magnetic recording transducer are fabricated. For example, the method 300 may start after a read transducer, return pole/shield and/or other structure have been fabricated.

A bottom shield 140 may optionally be provided, via step 302. Step 302 may include providing a multilayer or monolithic (single layer) magnetic shield. In other embodiments, step 302 may be omitted.

The bottom gap 190 may be provided, via step 304. Step 304 may include depositing a nonmagnetic layer. In some embodiments, the bottom gap and the side gap 180 are formed from a single layer and are provided together. In embodiments in which the bottom shield 140 is omitted, the bottom gap 190 provided in step 304 is desired to be thick as described above. Thus, the side shields extend well below the bottom of the pole tip 130. The pole 130 is provided, via step 306. Step 306 provides the pole such that the top is wider than the bottom. Thus, the sidewall angle, α, is formed. The side gap 180 is formed, via step 308. At least part of step 308 may be combined with step 304 if the side gap 180 and bottom gap 190 are formed together.

The side shields 150 are provided, via step 310. Thus, side shields 150 having pole-facing surfaces 152 that are close to (or at) vertical may be fabricated. The top shield 160 is provided, via step 312. The top shield 190 is magnetically coupled with the side shields 150. Thus, the side shields 150 may physically contact the top shield 160. Fabrication of the disk drive 100 may then be completed.

Using the method 300, the transducer 120 may be provided. Transducers 120', 120'', 120''', 220, 220', 220'' and/or 220''' may be fabricated in a similar fashion. Thus, the benefits described above for shingle recording may be achieved.

What is claimed is:

1. A shingle magnetic write apparatus comprising:
   a pole having a pole tip region including a bottom, a top wider than the bottom, a first side and a second side at a sidewall angle from a down track direction;
   a side gap adjacent to at least the first side and the second side;
   a write gap adjacent to the top of the pole;
   a top shield, the write gap being between the top shield and the top of the pole; and
   at least one side shield being magnetically connected with the top shield and extending past the bottom of the pole tip region, the side gap being between the at least one side shield and the pole, the at least one side shield having at least one pole-facing surface at a side shield angle from the down track direction, the side shield angle being less than the sidewall angle, being not more than five degrees, and being not less than two degrees from the down track direction.

2. The shingle magnetic write apparatus of claim 1 wherein the side gap has a width and wherein the side shield angle is not more than one-half of the sidewall angle such that the width of the side gap monotonically increases from the top of the pole toward the bottom of the pole.

3. The shingle magnetic write apparatus of claim 2 wherein the side shield angle is not more than one-third of the sidewall angle.

4. The shingle magnetic write apparatus of claim 2 further comprising:
   a bottom shield; and
   a bottom gap residing between the bottom shield and the bottom of the pole, the bottom gap having a height greater than the width of the side gap.

5. The shingle magnetic write apparatus of claim 4 wherein the bottom shield is magnetically coupled with the at least one side shield.

6. The shingle magnetic write apparatus of claim 1 wherein the sidewall angle is not more than fifteen degrees and at least four degrees.

7. The shingle magnetic write apparatus of claim 6 wherein the sidewall angle is not more than nine degrees.

8. The shingle magnetic write apparatus of claim 6 wherein the sidewall angle is at least twelve degrees.

9. A data storage device comprising:
   a media;
   a slider having an air-bearing surface (ABS) and a shingle magnetic write transducer, the shingle magnetic write transducer including a pole, a side gap, a write gap, a top shield and at least one side shield magnetically connected with the top shield, the pole having a pole tip region including a bottom, a top wider than the bottom, a first side and a second side at a sidewall angle from a down track direction, the side gap being adjacent to at least the first side and the second side, the write gap being adjacent to the top of the pole, the write gap being between the top shield and the top of the pole, the at least one side shield being magnetically connected with the top shield and extending past the bottom of the pole tip region, the side gap being between the at least one side shield and the pole, the at least one side shield having at least one pole-facing surface at a side shield angle from the down track direction, the side shield angle being not more than one-third of the sidewall angle, being not less than two degrees and being not more than five degrees.

10. The data storage device of claim 9 wherein the side gap has a width and wherein the shingle magnetic write transducer further includes:
    a bottom shield; and
    a bottom gap residing between the bottom shield and the bottom of the pole, the bottom gap having a height greater than the width of the side gap.

11. A method for fabricating a magnetic write apparatus comprising:
    providing a pole having a pole tip region including a bottom, a top wider than the bottom, and a plurality of sides comprising a first side and second side at a sidewall angle from a down track direction;
    providing a side gap adjacent to at least the first side and the second side;
    providing a write gap adjacent to the top of the pole;
    providing a top shield, the write gap being between the top shield and the top of the pole; and
    providing at least one side shield magnetically connected with the top shield and extending past the bottom of the pole tip region, the side gap being between the at least one side shield and the pole, the at least one side shield having at least one pole-facing surface at a side shield angle from the down track direction, the side shield angle being less than the sidewall angle, being not less than two degrees and being not more than five degrees.

12. The method of claim 11 wherein the side gap has a width and wherein the side shield angle is not more than one-half of the sidewall angle such that the width of the side gap monotonically increases from the top of the pole toward the bottom of the pole.

13. The method of claim 12 wherein the side shield angle is not more than one-third of the sidewall angle.

14. The method of claim 12 further comprising:
    providing a bottom shield; and
    providing a bottom gap between the bottom shield and the bottom of the pole, the bottom gap having a height greater than the width of the side gap.

15. The method of claim 14 wherein the bottom shield is magnetically coupled with the at least one side shield.

\* \* \* \* \*